United States Patent Office 2,700,267
Patented Jan. 25, 1955

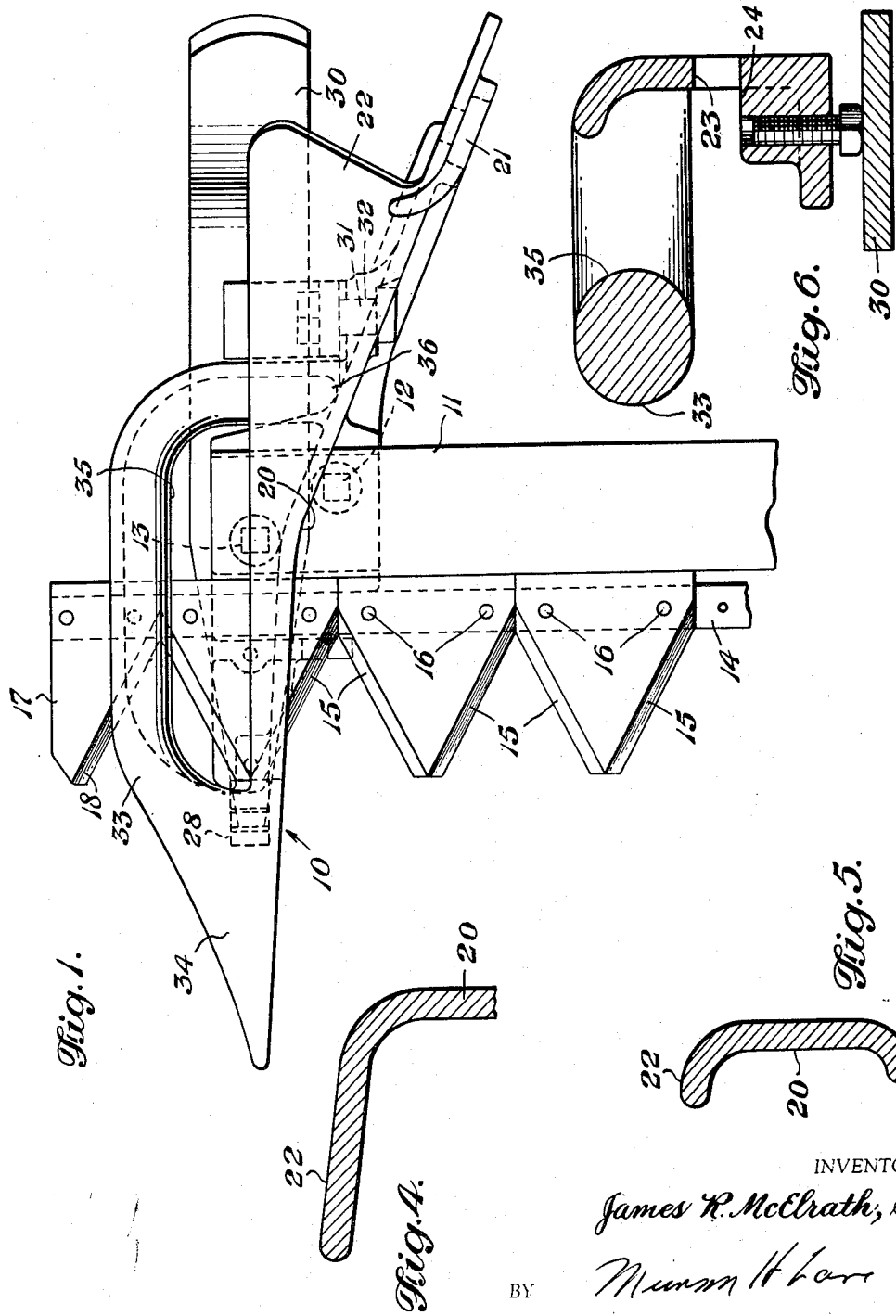

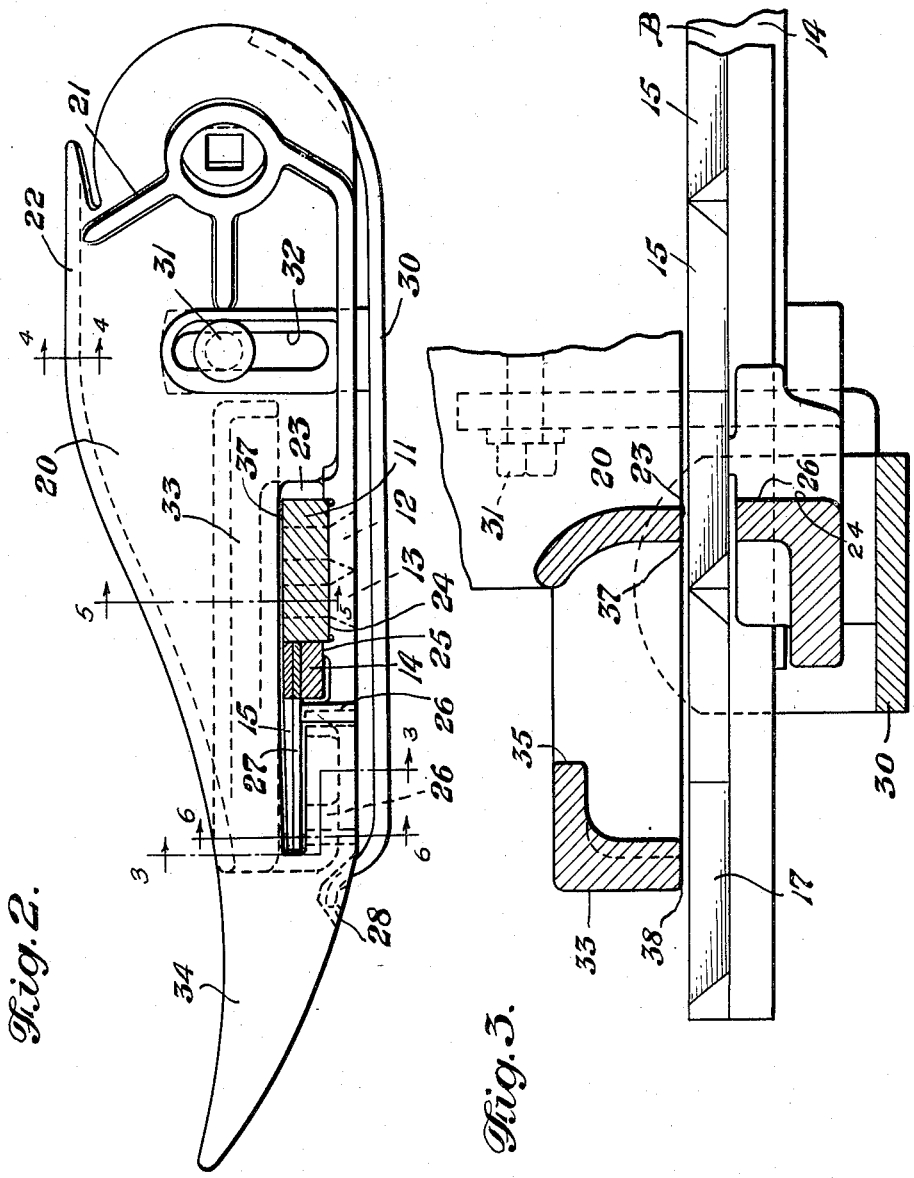

2,700,267

NONCLOGGING RECIPROCATING CUTTER BAR

James R. McElrath, Sr., Mifflin Township, Pa.

Application September 2, 1952, Serial No. 307,556

1 Claim. (Cl. 56—307)

This invention relates to an improved shoe or cutter head and cutting bar or sickle for mechanical mowing machines, and more particularly to a shoe and its cooperating cutting bar which may be operated without clogging.

A primary object of the invention is the provision of an improved shoe of this nature, particularly characterized by the restricted aperture within which the cutting bar reciprocates, together with an improved cutting bar which greatly reduces the possibility of grass, straw or the like being jammed in the shoe during the operation of the mower.

As conducive to a clearer understanding of this invention, it may here be pointed out that standard shoes on mechanical mowers are subjected to frequent clogging. When such shoes are clogged the cutting bars jam or lock, preventing operation. This clogging necessitates a thorough cleaning before mowing can be continued, delaying work many times a day. In the past many devices, both complex and expensive, have been suggested as a solution to this problem, although, to the present, no real answer has been found.

An important object of this invention is to obviate the above difficulties by the provision of a shoe which resists clogging and a cooperating cutting bar which will clear rather than jam the shoe.

A further object of this invention is the provision of an improved shoe of this nature together with an improved cutting bar simple in structure, efficient in operation, and cheap to manufacture. Other objects will be in part obvious and in part pointed out hereinafter.

My invention is applicable to a conventional mowing machine having a transversely extending mower beam, a sickle mounted for reciprocating movement on the mower beam, a cutter head attached to the outer end of the beam and extending in the general direction of movement of the machine and having an aperture to permit passage of the cutter bar therethrough, and having a generally forwardly and upwardly directed toe portion. In accordance with my invention the sickle is provided with a half sickle extension projecting beyond the aperture in the cutter head a substantial distance when the sickle is in its outermost position, and a guard member attached at one end to the toe of the cutter head and extending outwardly and rearwardly therefrom and above the sickle extension.

The invention, accordingly, consists of the features of construction, combinations of elements, and arrangements of parts, as will be exemplified in the structure to be hereinafter described, and the scope of the application of which will be indicated in the following claim.

In the accompanying drawing, in which is shown one of the various possible embodiments of my invention, Fig. 1 is a plan view of the shoe and a fragment of the cutting bar;

Fig. 2 is a side elevation of the shoe with the cutting bar in place;

Fig. 3 is an enlarged sectional view taken substantially along the line 3—3 of Fig. 2;

Fig. 4 is an enlarged sectional view taken substantially along the line 4—4 of Fig. 2;

Fig. 5 is an enlarged sectional view taken substantially along the line 5—5 of Fig. 2; and Fig. 6 is an enlarged sectional view taken substantially along the line 6—6 of Fig. 2.

Similar reference characters refer to similar parts throughout the several views of the drawing.

Having reference now to the drawing in detail, a shoe or cutter head, generally indicated by the numeral 10, is attached to the outer end of a mower beam 11, by bolts 12 and 13. Mounted for sliding or reciprocating movement on beam 11 is a cutting bar or sickle 14 to which knives 15 are attached by rivets 16, the heads of said rivets being positioned underneath the bar leaving the top, to all intents and purposes, smooth and having no appreciable projections. Fingers (not shown) which extend beneath the cutting bar 14 and are secured to beam 11 by any suitable means hold the cutting bar in slidable engagement with the beam 11. At the outer extremity of cutting bar 14 knife blade 17, having a single cutting edge 18, is secured in a similar fashion, the purpose of which will be described hereinafter in detail.

The shoe 10 consists in general of a vertical plate 20 reinforced by the usual ribs 21 disposed on its outer face and an additional rib 22 on its upper edge of somewhat greater dimensions. Centrally disposed between the top and bottom of the shoe 10 is a horizontal aperture 23 through which the cutting bar 14 is slidably inserted for operation. The inner lower seat 24 of the aperture 23 forms a saddle to which the beam 11 is secured and a raised portion 25 which the cutting bar 14 slidably engages, guiding the blades of knives 15 at a constant level. Slightly forward of raised portion 25 double mounts 26 support a stationary knife 27 which is positioned just beneath blades 15 of the cutting bar 14 and which cooperates with the reciprocating blades 15 during operation of the mower.

Referring to Figs. 1 and 2 ahead of aperture 23 on the bottom of shoe 10 is a curved double opened slot 28, shown in dotted lines, into which the forward, hook-shaped end of a runner 30, parallel and beneath the shoe, is placed. The rearward portion of the runner 30 is adjustably secured to the face 20 of the shoe by means of a bolt 31 within a vertical slot 32. The operation and method of securing runner 30 is conventional, serving to ease the shoe 10 over the ground and reduce shock.

The outer side of shoe 10 comprises a channel-shaped elbow or guard member 33, running from the tip 34 to outer face 20, forming aperture 35. The elbow 33 is an integral part of the shoe 10 at the tip or toe 34 and at 36 on face plate 20. As shown, the top 37 of the aperture 23 is at the same level as the bottom 38 of the elbow 33.

The tip or toe 34 of the shoe 10 is extended outward and curved upward slightly more than the conventional shaped shoe to protect the mechanism when the ground is particularly rough and uneven. By curving the toe 34 upward it has been found that gouging and toeing in are largely avoided.

An important feature of this invention is the size and shape of aperture 23 together with the cooperating cutter bar 14. Aperture 23 is of a size and shape to permit the easy operation of the cutting bar 14 therethrough and no larger. As pointed out above, mowing shoes heretofore have been subject to repeated clogging at this point. Straw, hay, grass, weeds, or other material jams this aperture, preventing the reciprocating movement of cutting bar 14.

Referring now to knife blade 17, which has a different shape from blades 15, the cutting bar 14 extends slightly further than conventional machines of this type. To this extension of the cutting bar single-bladed knife 17 is riveted in a manner similar to the attaching means for blades 15. Blade 17 passes just under guard member or elbow arm 33 across aperture 35 up to aperture 23. As there is no space between the cutting blades and the edges of the aperture 23 other than for the free sliding operation of cutting arm 14 straw or the like cannot clog the shoe. On the reverse stroke of the cutting arm 14, outwardly, the cut straw is pushed away from the shoe 10, clearing the blades for the reciprocal stroke, inwardly.

It is therefore clear that the device described herewith provides a non-clogging mowing machine shoe together with a cooperating cutting bar which cleans rather than clogs in operation.

As many possible embodiments may be made of the above invention, and, as many changes might be made in the embodiment set forth, it is to be understood that all matters hereinafter set forth, or shown in the accompanying drawing, are to be interpreted as illustrative and not in a limiting sense.

I claim:

In a mowing machine having a transversely extending mower beam, a sickle mounted for reciprocating movement on said mower beam, a cutter head attached to the cutter end of the beam and extending in the direction of movement of the machine and having an aperture to permit passage of said cutter bar therethrough and having a forwardly and upwardly directed toe portion; the improvement wherein the sickle is provided with a half sickle extension projecting beyond the aperture in the cutter head a substantial distance when the sickle is in its outermost position, and a guard member attached at one end to the toe of the cutter head extending outwardly and rearwardly therefrom and above the sickle extension.

References Cited in the file of this patent

UNITED STATES PATENTS

| | | |
|---|---|---|
| 992,691 | Seger et al. | May 16, 1911 |
| 1,484,631 | Faethe | Feb. 26, 1924 |
| 2,051,394 | Reever | Aug. 18, 1936 |
| 2,234,783 | Snow | Mar. 11, 1941 |
| 2,629,219 | Hooley | Feb. 24, 1953 |